(12) United States Patent
Kim

(10) Patent No.: US 6,507,871 B1
(45) Date of Patent: Jan. 14, 2003

(54) TERMINAL SYSTEM HAVING BOTH ATM TERMINAL FUNCTION AND ATM-BASED-ADSL TERMINAL FUNCTION AND METHOD THEREFOR

(75) Inventor: Giu-yeol Kim, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/217,189

(22) Filed: Dec. 22, 1998

(30) Foreign Application Priority Data

Dec. 29, 1997 (KR) .............................................. 97-76404

(51) Int. Cl.⁷ ............................................. G06F 15/16
(52) U.S. Cl. ....................... 709/230; 370/469; 370/235; 370/395
(58) Field of Search ................................. 709/230, 231, 709/228, 223; 370/395, 463, 258, 469, 394, 397, 474

(56) References Cited

U.S. PATENT DOCUMENTS

| | | | |
|---|---|---|---|
| 5,026,088 A | * 6/1991 | Stuart | 280/637 |
| 5,548,587 A | 8/1996 | Bailey et al. | 370/60.1 |
| 5,864,554 A | * 1/1999 | Rostoker et al. | 370/395 |
| 5,872,784 A | * 2/1999 | Rostoker et al. | 370/395 |
| 5,914,955 A | * 6/1999 | Rostoker et al. | 370/395 |
| 5,999,518 A | * 12/1999 | Nattkemper et al. | 370/58 |
| 6,084,880 A | * 7/2000 | Bailey et al. | 370/395 |
| 6,084,881 A | * 7/2000 | Fosmark et al. | 370/397 |
| 6,198,752 B1 | * 5/2001 | Lee | 370/474 |
| 6,233,250 B1 | * 5/2001 | Liu et al. | 370/469 |

FOREIGN PATENT DOCUMENTS

| | | |
|---|---|---|
| JP | 4-180323 | 6/1992 |
| JP | 5-327697 | 12/1993 |
| JP | 6-37842 | 2/1994 |
| JP | 6-164682 | 6/1994 |
| JP | 9-252301 | 9/1997 |
| JP | 9-265439 | 10/1997 |
| JP | 9-512404 | 12/1997 |
| JP | 10-135986 | 5/1998 |
| JP | 10-327161 | 12/1998 |

OTHER PUBLICATIONS

"OSI—Computer Network in the Future", the Nonprofit Corporation Japanese Standard, Feb. 27, 1987, pp. 36–37.
"Utilized ATM–LAN Technology", Triceps, Jun. 1, 1997, pp. 41–44, 116–118 and 128–132.
Japanese Economy Electronics, vol. 676 (Nov. 18, 1996), pp. 89–108.
Japanese Economy Electronics, vol. 605 (Apr. 11, 1994), pp. 93–107.
Computer and Network LAN, Oct. 1994, pp. 48–59.
ATM–LAN; Second Impression, Jul. 5, 1995, pp. 197–203.

* cited by examiner

*Primary Examiner*—David Wiley
(74) *Attorney, Agent, or Firm*—Staas & Halsey LLP

(57) ABSTRACT

A terminal system having both an asynchronous transfer mode terminal function and an asynchronous transfer mode-based asymmetric digital subscriber line terminal function and method therefor that includes a physical media dependent sublayer of an asynchronous transfer mode network, a physical media dependent sublayer of an asymmetric digital subscriber line network, and a transmission conversion portion. The transmission conversion portion converts serial data input through a connected physical media dependent sublayer into parallel data to transfer the converted parallel data, and receives parallel data and converts the parallel data into serial data to transfer the converted serial data to the connected physical media dependent sublayer. A cell segmentation and reassembly portion assembles the parallel data transferred from the transmission conversion portion to change the assembled data into user information, and divides user information to be transmitted by a user into predetermined data cells to output the data cells to the transmission conversion portion.

20 Claims, 6 Drawing Sheets

TERMINAL SYSTEM HAVING BOTH ATM TERMINAL FUNCTION AND ATM-BASED-ADSL TERMINAL FUNCTION AND METHOD THEREFOR

CROSS-REFERENCE TO RELATED APPLICATIONS

This application claims the benefit of Korean Application No. 97-76404, filed Dec. 29, 1997 in the Korean Patent Office, the disclosure of which is incorporated herein by reference.

BACKGROUND OF THE INVENTION

1. Field of the Invention

The present invention relates to a terminal system having both an asynchronous transfer mode terminal function and an asynchronous transfer modebased asymmetric digital subscriber line terminal function and method therefor.

2. Description of the Related Art

While an asynchronous transfer mode ("ATM") terminal generally complies with particular ATM forum standards, an ATM-based-asymmetric digital subscriber line ("ADSL") terminal generally complies with ADSL forum standards. The ATM terminal includes physical media, a physical media dependent ("PMD") sublayer, and a transmission conversion ("TC") portion that are different from those of the ATM-based-ADSL terminal, and an ATM cell segmentation and reassembly ("SAR") portion that is the same as a SAR portion of the ATM-based-ADSL terminal.

FIG. 1A is a block diagram illustrating a conventional ATM-based-ADSL terminal system. As illustrated in FIG. 1A, the conventional ATM-based-ADSL terminal system includes an ADSL PMD sublayer 100 in which a public switched telephone functions as a transfer medium, an ADSL TC portion 102, and an ATM SAR portion 104.

As illustrated in FIG. 1A, during operation of the conventional ATM-based-ADSL terminal system, the ADSL TC portion 102 receives a cell of serial data through the ADSL PMD sublayer 100. The ADSL TC portion 102 delineates the received cell according to a control signal received through a peripheral component interconnect ("PCI") bus and ATM SAR portion 104, divides the serial data into units of ATM cells, and transfers the ATM cells in parallel using a UTOPIA Rx1 bus. The ATM SAR portion 104 assembles the data received from the ADSL TC portion 102 to generate and output user information.

When a user attempts to transfer data through the ADSL network, the ATM SAR portion 104 transfers the user information to be transmitted to the ADSL TC portion 102. The ADSL TC portion 102 converges the ATM cells transferred in parallel from the ATM SAR portion 104 through a UTOPIA Tx1 bus into an ADSL data frame, and transfers the ADSL data frame according to a transmission clock input from the ADSL PMD sublayer 100.

A conventional ATM terminal system is illustrated in the block diagram of FIG. 1B. The conventional ATM terminal system of FIG. 1B includes an ATM physical media dependent ("PMD") sublayer 106, an ATM TC portion 108, and an ATM SAR portion 110.

Operation of the conventional ATM terminal system of FIG. 1B is similar to the conventional ATM-based ADSL terminal system of FIG. 1A. Namely, the ATM TC portion 108 delineates a cell of serial data received from an ATM network through the ATM PMD sublayer 106, according to control signals received through a PCI bus and the ATM SAR portion 110, divides the serial data into units of ATM cells, and transfers the ATM cells in parallel using a UTOPIA Rx2 bus. The ATM SAR portion 110 assembles the received data into user information and outputs the user information.

When a user attempts to transfer data through the ATM network, the ATM SAR portion 110 divides the user information that is to be transferred into an ATM cell pattern. The ATM TC portion 108 converges the ATM cells that are transferred in parallel through a UTOPIA Tx2 bus into an ATM data frame, and transfers the ATM data frame according to a transmission clock received from the ATM PMD 106.

However, in order to connect the conventional ATM network with the conventional ADSL network through a terminal system, different terminal systems are required for each network.

SUMMARY OF THE INVENTION

It is an object of the present invention to provide a terminal system that shares a common portion of an ATM terminal system and an ATM-based-ADSL terminal system, thus having the functions of both, in order to connect the ATM network and the ADSL network through a terminal system.

Additional objects and advantages of the present invention will be set forth in part in the description which follows and, in part, will be obvious from the description, or may be learned by practice of the invention.

Accordingly, objects of the invention are achieved by a terminal system that enables a user to selectively connect an asynchronous transfer mode terminal through a corresponding physical media dependent sublayer, or an asymmetric digital subscriber line terminal through a corresponding physical media dependent sublayer. The terminal system includes a transmission conversion portion that connects with the physical media dependent sublayers and converts serial data from the connected physical media dependent sublayer into parallel data. A cell segmentation and reassembly portion assembles the parallel data from the transmission conversion portion, changes the assembled data into user information including user information to be transferred, divides the user information to be transmitted into predetermined data cells, and outputs the predetermined data cells to the transmission conversion portion. The transmission conversion portion converts the predetermined data cells into serial data and transfers the converted serial data to the connected physical media dependent sublayer.

Further objects of the invention are achieved by a terminal system having both an asynchronous transfer mode terminal function and an asynchronous transfer mode-based asymmetric digital subscriber line terminal function, that enables a user to select connection to an asynchronous transfer mode network or an asymmetric digital subscriber line network. The terminal system includes a first transmission conversion portion intrinsic to the asynchronous transfer mode network, and a second transmission conversion portion intrinsic to the asymmetric digital subscriber line. A common transmission conversion portion converts serial data from the first transmission conversion portion and the second transmission conversion portion into parallel data. Data is transferred through the first transmission conversion portion and the common transmission conversion portion when the asynchronous transfer mode network is selected, and data is transferred through the second transmission conversion portion and the common transmission portion when the asymmetric digital subscriber line is selected by the user.

Further objects of the invention are achieved by a terminal system having both an asynchronous transfer mode terminal function and an asynchronous transfer mode-based asymmetric digital subscriber line terminal function, that enables a user to selectively connect an asynchronous transfer mode network or an asymmetric digital subscriber line network. The terminal system includes a first physical media dependent sublayer, corresponding to the asynchronous transfer mode network, to output data cells, and a second physical media dependent sublayer, corresponding to the asymmetric digital subscriber line network, to output data cells. A first transmission conversion portion intrinsic to the asynchronous mode network delineates the data cells output by the first physical media dependent sublayer, and a second transmission conversion portion intrinsic to the asymmetric digital subscriber line network delineates the data cells output by the second physical media dependent sublayer. A selector selects the first transmission conversion portion or the second transmission conversion portion, and a common transmission conversion portion converts serial data from the transmission conversion portion selected by the selector into parallel data. A cell segmentation and reassembly portion assembles the parallel data from the common transmission conversion portion, changes the assembled data to user information that includes user information to be transmitted, divides the user information to be transmitted into predetermined data cells, and outputs the predetermined data cells to the common transmission conversion portion. The common transmission conversion portion converts the predetermined data cells into serial data and outputs the converted serial data to the selector.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 1A:
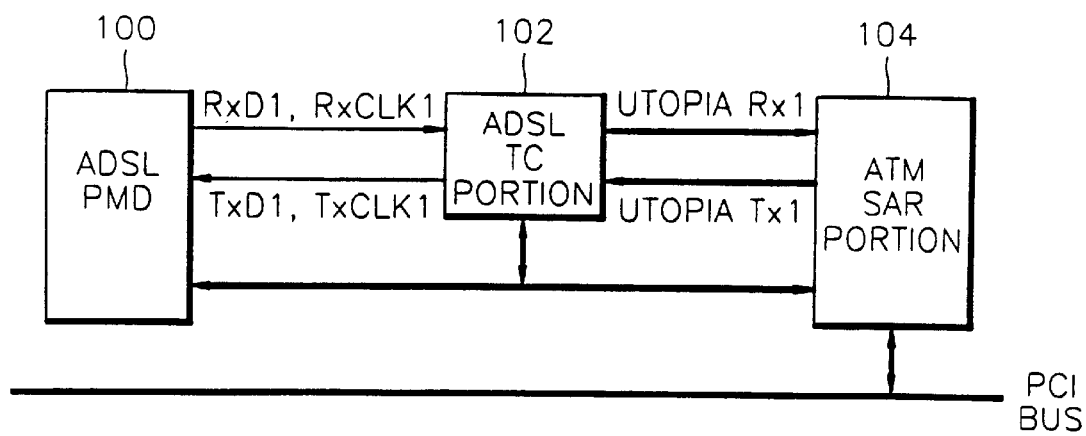
FIG. 1A is a block diagram of a conventional ATM-based-ADSL terminal system.
Figure 1B:
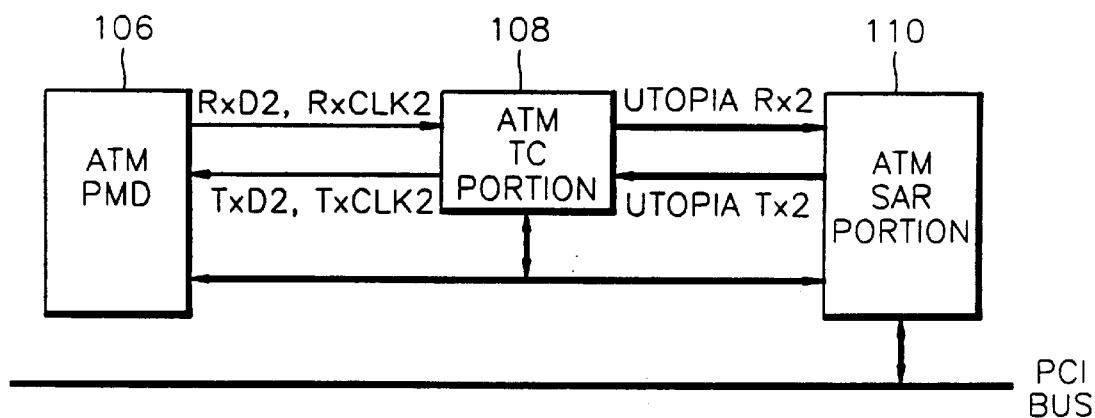
FIG. 1B is a block diagram of a conventional ATM terminal system.
Figure 2:
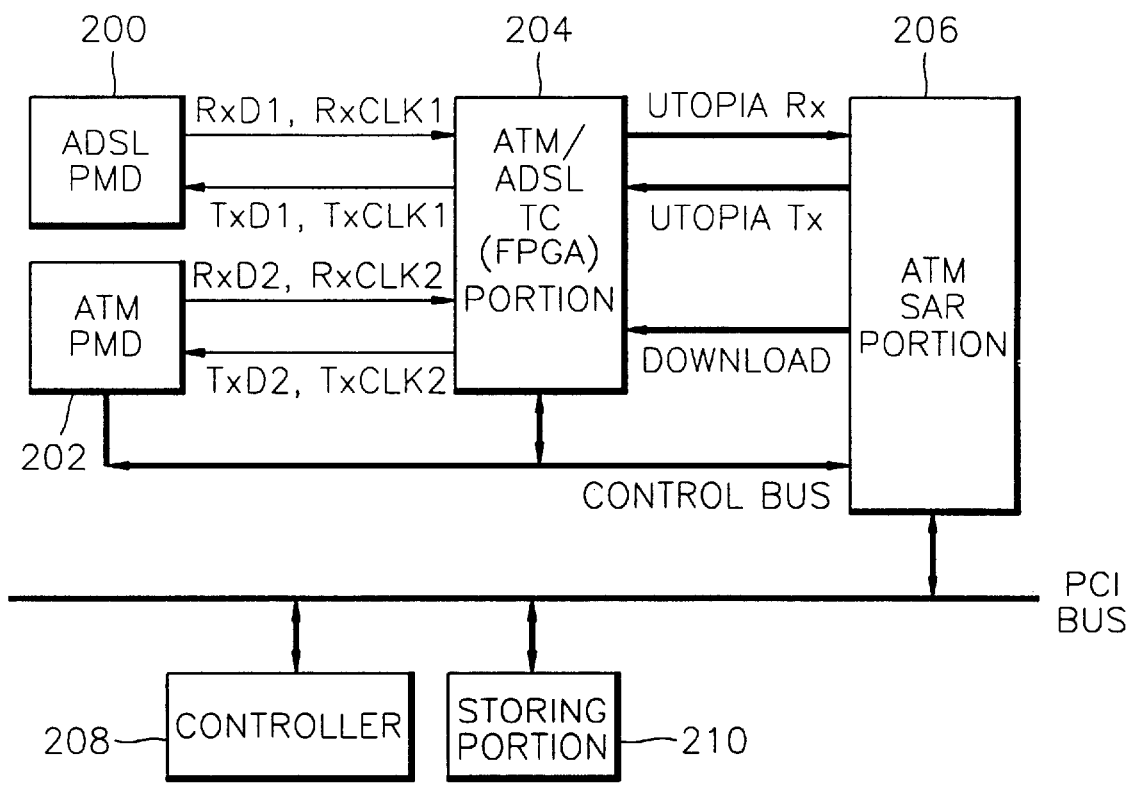
FIG. 2 is a block diagram of a terminal system having both an ATM terminal function and an ATM-based-ADSL terminal function, according to a preferred embodiment of the present invention.

A preferred embodiment of the present invention will now be described in detail with reference to the attached drawings. FIG. 2 is a block diagram of a terminal system having both an ATM terminal function and an ATM-based-ADSL terminal function, according to the preferred embodiment of the present invention. The terminal system of FIG. 2 includes an ADSL PMD 200, an ATM PMD 202, an ATM/ADSL TC portion 204 that includes an ATM TC and an ADSL TC portion, an ATM SAR portion 206, and a controller 208. When the ATM/ADSL TC portion 204 is manufactured as a field programmable gate array ("FPGA"), the terminal system of FIG. 2 also includes a storing portion 210.

It is assumed that in the operation of the terminal system of FIG. 2, data that is run through the ADSL network has an ATM cell pattern. Initially, when a user selects a network connection at the controller 208, the ATM SAR portion 206 downloads a configuration file stored in the storing portion 210 to the FPGA constructed ATM/ADSL TC portion 204. More specifically, when a user attempts to connect with the ATM network, the user selects the ATM network through a user interface of an application program. Since a configuration file corresponding to the ATM TC portion is downloaded to the FPGA constructed ATM/ADSL TC portion 204 through a PCI interface of the ATM SAR portion 206, a function corresponding to the ATM TC portion of the ATM/ADSL TC portion 204 is performed by the FPGA constructed ATM/ADSL TC portion 204. When the user selects the ADSL network, the configuration file for realizing the ADSL TC portion is downloaded to the FPGA constructed ATM/ADSL TC portion 204, activating a function corresponding to the ADSL TC portion. Hardware functions can be realized according to the configuration file in the FPGA device.

The ATM/ADSL TC portion 204 activates transmission conversion corresponding to the configuration file according to a control signal of each block, output from the controller 208 and received through the PCI bus, decodes the serial data input from the ADSL PMD 200 or the ATM PMD 202 according to the corresponding data structure for cell delineation, divides the decoded serial data into units of ATM cells, and transfers the ATM cells in parallel using a UTOPIA Rx bus. At this time, a transmission clock TxCLK1 is adjusted to correspond to a clock RxCLK1 received from the ADSL PMD 200, or a clock RxCLK2 received from the ATM PMD 202. The ATM SAR portion 206 assembles the received data into user information and outputs the user information. When the user attempts to transfer data to the ADSL network or the ATM network, the ATM SAR portion 206 divides the user information to be transmitted into an ATM cell pattern having a header area of 5 bytes and a data area of 48 bytes. The ATM/ADSL TC portion 204 converges the ATM cells transferred from the ATM SAR portion 206 through a UTOPIA Tx bus into an ATM/ADSL data frame, and transfers the ATM/ADSL frame according to a transmission clock received from the ADSL PMD 200 or the ATM PMD 202.

Figure 3A:
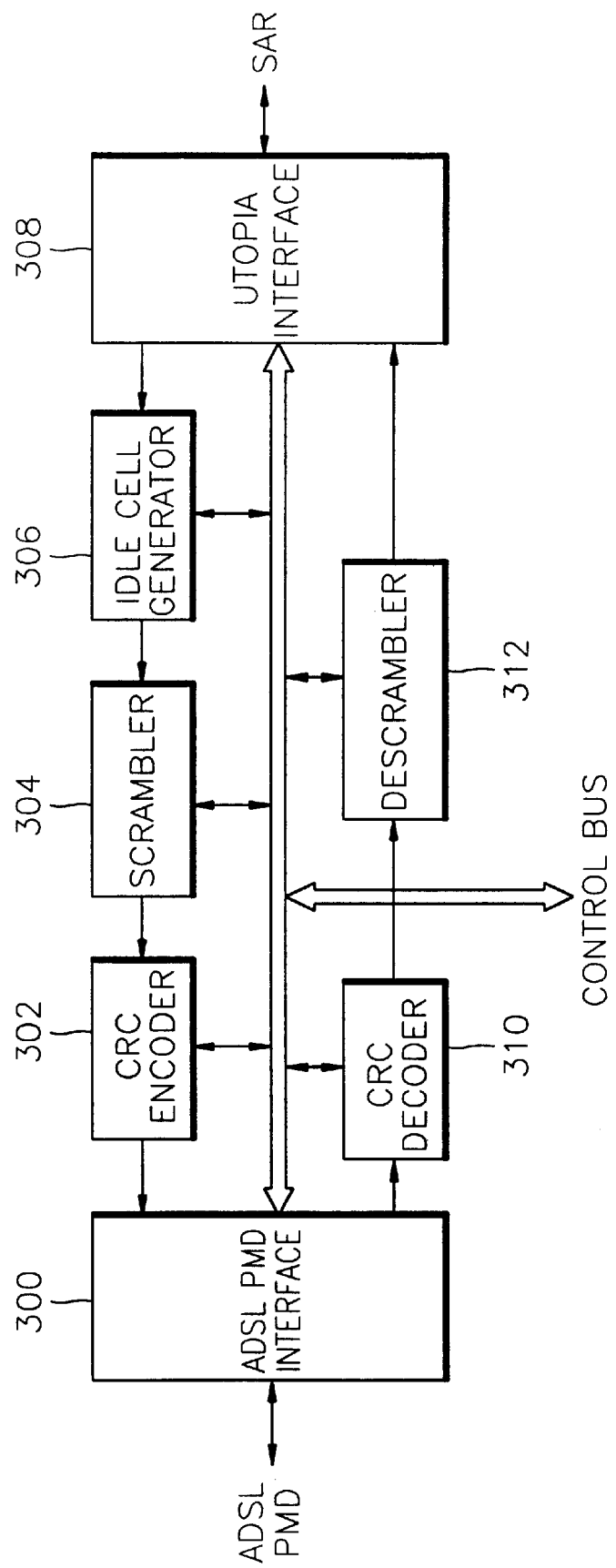
FIG. 3A is a block diagram of an ADSL TC portion of the terminal system of FIG. 2.

FIG. 3A is a block diagram of the ADSL TC portion of the ATM/ADSL TC portion 204 of FIG. 2. The ADSL TC portion illustrated in FIG. 3A includes an ADSL PMD interface 300, an idle cell generator 306, a scrambler 304, a cyclic redundancy check ("CRC") encoder 302, a CRC decoder 310, a descrambler 312, and a Utopia interface 308.

Operation of the ADSL TC portion of FIG. 3A is as follows. When data is received from the ADSL network, when serial data is input through the ADSL PMD interface 300, the CRC decoder 310 delineates a cell using a correlation of a header area of the cell. More particularly, the CRC decoding is performed with respect to the serial data as it is input bit by bit, determining a point at which the result becomes 0. This point at which the result becomes 0 is a reference for dividing the boundary of the cells. When the boundary of the cells is determined, the descrambler 312 descrambles a data area of a cell scrambled by a transmitter, and converts the data area into a parallel data pattern in one byte units. The Utopia interface 308 temporarily stores data that is converted into the parallel pattern in the descrambler 312, and transfers the data to the ATM SAR portion 206. The data is temporarily stored for a speed match with the ATM SAR portion 206.

When the data is transmitted, the parallel data input from the ATM SAR portion 206 is temporarily stored in the Utopia interface 308 and then transferred. When there is no data cell to be transferred to a line in which data cells must always flow, the idle cell generator 306 generates idle cells and inserts the generated idle cells into the line. The scrambler 304 randomizes the data area of the ATM cell in order to adjust timing information, and converts the user information or the idle cells into a serial pattern. The CRC encoder 302 CRC encodes the header area of the ATM cell and transfers the encoded data to the ADSL PMD 200 through the ADSL PMD interface 300.

Figure 3B:
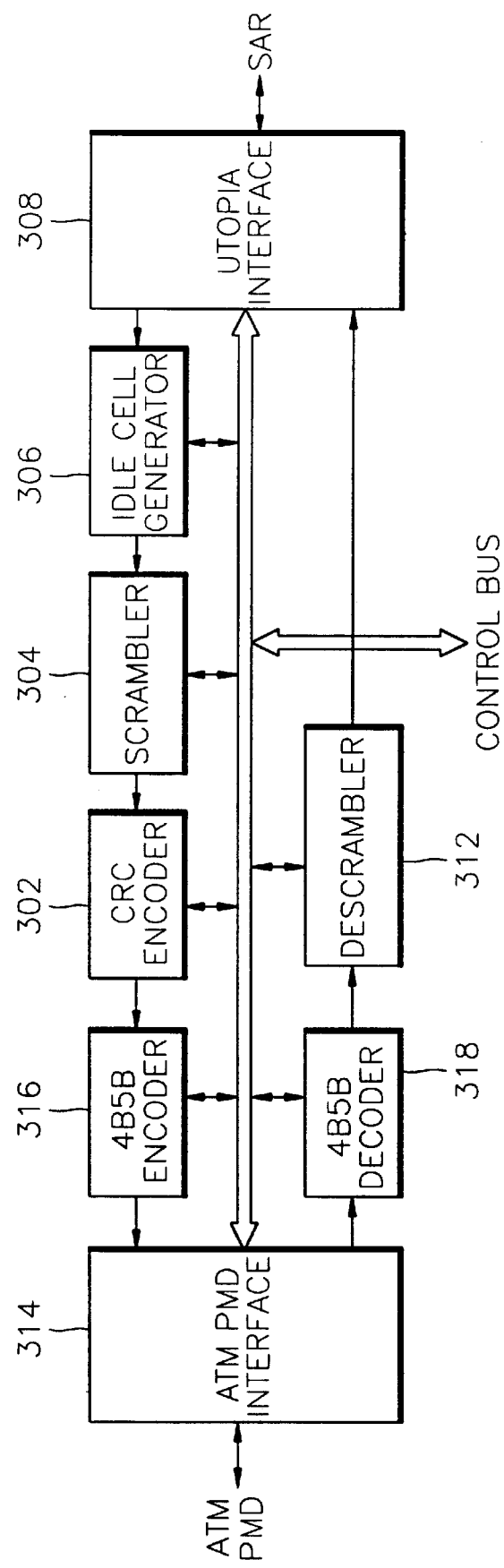
FIG. 3B is a block diagram of an ATM TC portion of the terminal system of FIG. 2.

FIG. 3B is a block diagram of the ATM TC portion of the ATM/ADSL TC portion 204 of FIG. 2. The ATM TC portion illustrated in FIG. 3B includes an ATM PMD interface 314, an idle cell generator 306, a scrambler 304, a CRC encoder 302, a 4B5B encoder 316, and a 4B5B decoder 318, a descrambler 312, and a Utopia interface 308.

The operations of the blocks in FIG. 3B, other than the ATM PMD interface 314, the 4B5B encoder 316, and the 4B5B decoder 318 are similar to those shown in FIG. 3A.

The 4B5B encoder 316 maps data that is in units of 4 bits, to data in units of 5 bits. The 4B5B decoder 318 performs an inverse mapping and provides a periodical timing signal for cell delineation and for an isochronous service.

Operation of the ATM TC portion of FIG. 3B is as follows. When data is received from the ATM network, the 4B5B decoder 318 maps data that is in units of 5 bits input from the ATM PMD interface 314 to data in units of 4 bits, delineates the cell, and provides a periodical timing signal for the isochronous service. The data input to the ATM TC portion has an additional code for informing the cell delineation, unlike the data input to the ADSL TC portion. When the cell is delineated, the descrambler 312 descrambles the data area and converts the descrambled cell into the parallel data in units of one byte. The Utopia interface 308 inputs the converted data to the ATM SAR portion 206.

When the data is transmitted, parallel data input from the ATM SAR portion 206 is temporarily stored in the Utopia interface 308. The idle cell generator 306 generates idle cells when there is no data to be transferred, and inserts them into a line in which data is transferred. The scrambler 304 randomizes the data area of the ATM cell in order to adjust timing information, and converts the user information or the idle cells to a serial pattern. The CRC encoder 302 CRC encodes a header area of the cell. The 4B5B encoder 316 maps the data that is in units of 4 bits to data in units of 5 bits, and transmits the data to the ATM PMD portion through the ATM PMD interface 314.

Figure 4A:
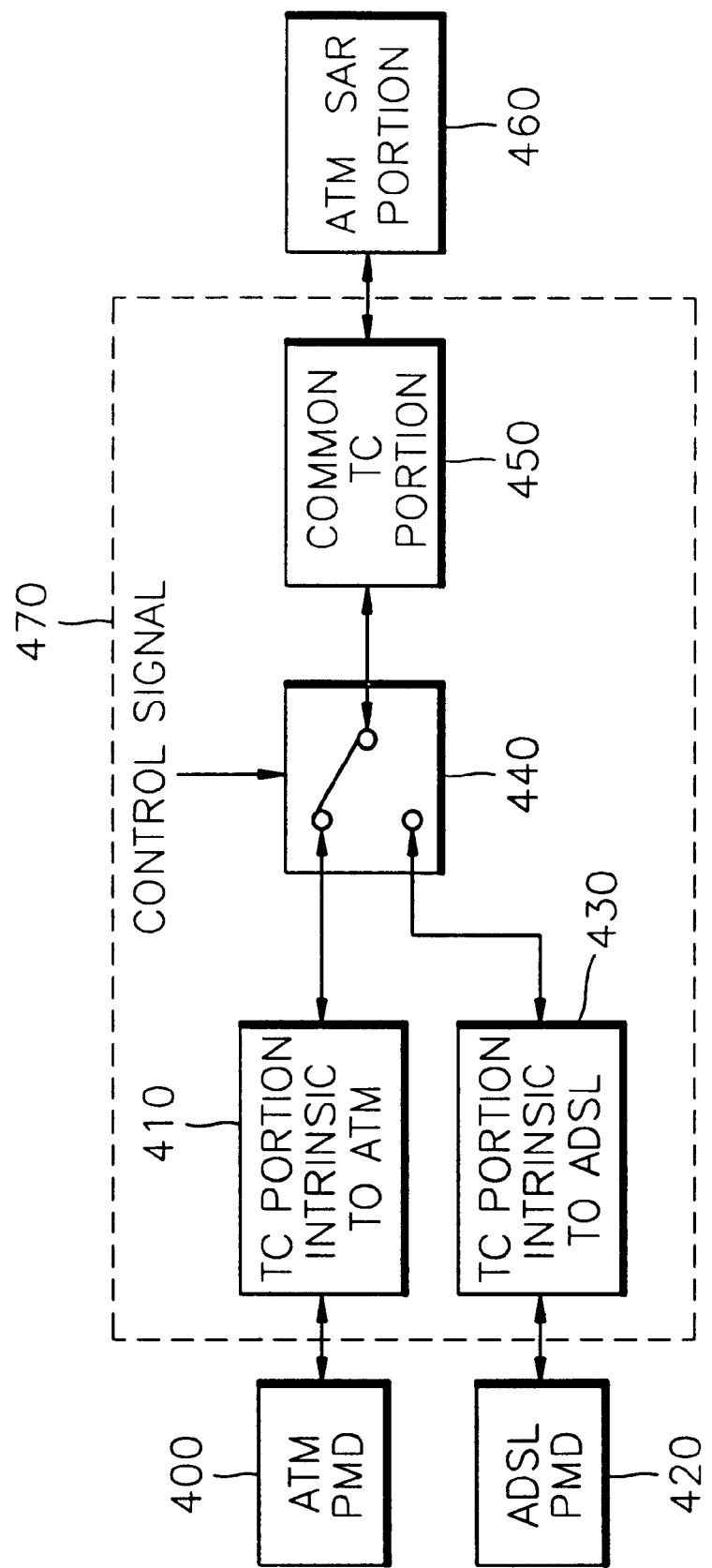
FIG. 4A is a block diagram of a terminal system having both an ATM terminal function and an ATM-based-ADSL terminal function, according to the preferred embodiment of the present invention, manufactured as an application specific integrated circuit.
Figure 4B:
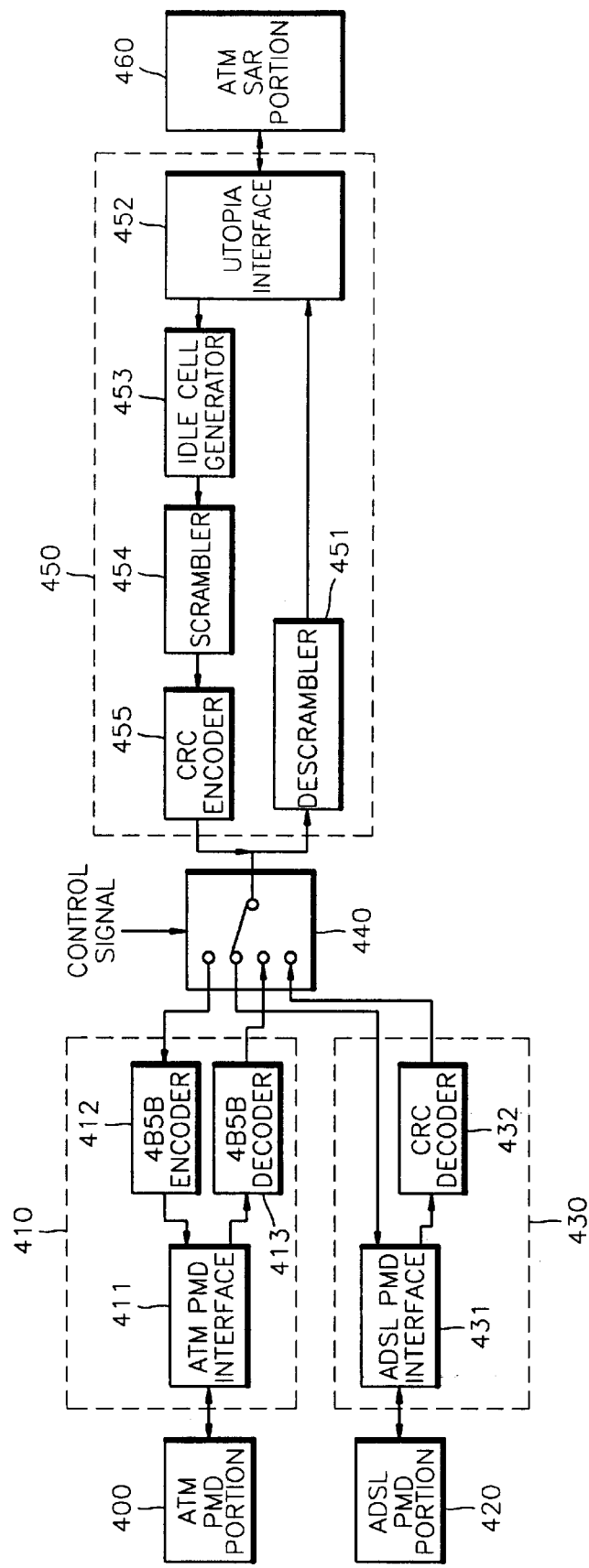
FIG. 4B is a detailed block diagram of the terminal system of FIG. 4A.

FIG. 4A is a block diagram of a terminal system having both the ATM terminal function and the ATM-based-ADSL terminal function according to the preferred embodiment of the present invention, and manufactured as an application specific integrated circuit ("ASIC"). FIG. 4B illustrates the terminal system of FIG. 4A in more detail.

The terminal system of FIG. 4A includes an ATM PMD 400, a TC portion 410 that is intrinsic to the ATM, an ADSL PMD 420, a TC portion 430 that is intrinsic to the ADSL, a selector 440, a common TC portion 450, and an ATM SAR portion 460. The dotted portion 470 is manufactured as an ASIC.

The TC portion 410 that is intrinsic to the ATM maps data cells in predetermined units and transfers the mapped data cells to delineate the data cells input from the ATM PMD 400, or inversely maps the user information to be transmitted by the user, and transfers the inversely mapped user information to the ATM PMD 400. The TC portion 430 that is intrinsic to the ADSL cyclic redundancy check decodes data cells to delineate the data cells input from the ADSL PMD 420. The selector 440 selects either the TC portion 410 intrinsic to ATM or the TC portion 430 intrinsic to ADSL, according to the selection of the user. The common TC portion 450 converts serial data, input from one of the TC portions 410, 430 connected by the selector 440, into parallel data, or converts parallel data input from the ATM SAR portion 460 into serial data, and outputs the converted data to the selector 440. The ATM SAR portion 460 assembles the parallel data input from the common TC portion 450, changes the assembled data into user information, divides the user information to be transmitted by the user into predetermined data cells, and outputs the data cells to the common TC portion 450.

As illustrated in FIG. 4B, the TC portion 410 that is intrinsic to ATM includes an ATM PMD interface 411, a 4B5B encoder 412, and a 4B5B decoder 413. The TC portion 430 that is intrinsic to ADSL includes an ADSL PMD interface 431 and a CRC decoder 432. The common TC portion 450 includes a descrambler 451, a Utopia interface 452, an idle cell generator 453, a scrambler 454, and a CRC encoder 455.

Operation of the terminal system of FIGS. 4A and 4B is as follows. When the user selects the ATM network through the selector 440, data is transferred through the TC portion 410 intrinsic to ATM and the common TC portion 450. When the ADSL network is selected by the user, the data is transferred through the TC portion 430 intrinsic to ADSL and the common TC portion 450.

The operation of the individual elements is the same as that of the corresponding elements shown in FIGS. 3A and 3B.

According to the present invention, it is possible to selectively connect the ATM network or the ADSL network through a terminal system. Furthermore, since it is constructed using the FPGA or the ASIC, the terminal system is inexpensive.

Although a preferred embodiment of the present invention have been shown and described, it would be appreciated by those skilled in the art that changes may be made in this embodiment without departing from the principles and spirit of the invention, the scope of which is defined in the claims and their equivalents.

What is claimed is:

1. A terminal system that enables a user to selectively connect an asynchronous transfer mode terminal through a first physical media dependent sublayer, or an asymmetric digital subscriber line terminal through a second physical media dependent sublayer, comprising:

a transmission conversion portion that selectively connects with the first and the second physical media dependent sublayers and converts serial data from the connected physical media dependent sublayer into parallel data; and a cell segmentation and reassembly portion to assemble the parallel data from the transmission conversion portion, and change the assembled data into user information including user information to be transferred.

2. The terminal system of claim 1, wherein the cell segmentation and reassembly portion divides the user information to be transferred into predetermined data cells, and outputs the predetermined data cells to the transmission conversion portion, and wherein the transmission conversion portion converts the predetermined data cells into serial data and transfers the converted serial data to the connected first or second physical media dependent sublayer.

3. The terminal system of claim 1, wherein the transmission conversion portion is realized by a field programmable gate array.

4. The terminal system of claim 1, wherein the cell segmentation and reassembly portion divides the user information to be transmitted into asynchronous transfer mode cells having a header area of 5 bytes and a data area of 48 bytes.

5. The terminal system of claim 1, further comprising a selector to select the physical media dependent sublayer that is connected to the transmission selection portion.

6. The terminal system of claim 1, wherein the transmission conversion portion comprises:
 a first interface to input serial data received from the asymmetric digital subscriber line terminal;
 a decoder to cyclic redundancy check decode the serial data from the interface;
 a descrambler to descramble a data area of the serial data transferred from the decoder and convert the descrambled data into a parallel data pattern;
 a second interface to store the parallel pattern data and transfer the descrambled data to the cell segmentation and reassembly portion, and to store the predetermined data cells output from the cell segmentation and reassembly portion;
 an idle cell generator to generate idle cells and insert the generated idle cells when there is no data to be transferred to the connected physical media dependent sublayer;
 a scrambler to scramble a data area of the predetermined data cells to adjust timing information and to convert the user information or the idle cells to serial data; and
 an encoder to cyclic redundancy check encode the predetermined data cells and transmit the encoded data cells to the connected physical media dependent sublayer.

7. The terminal system of claim 1, wherein the transmission conversion portion comprises:
 a first interface to input serial data received from the asynchronous transfer mode terminal;
 a decoder to map the serial data from the first interface that is in units of five bits to data in units of four bits, and to delineate the mapped serial data and provide a periodic timing signal;
 a descrambler to descramble a data area of the serial data transferred from the decoder and to convert the descrambled data into a parallel data pattern;
 a second interface to store the parallel pattern data and to transfer the descrambled data to the cell segmentation and reassembly portion;
 an idle cell generator to generate idle cells and insert the generated idle cells when there is no data to be transferred to the asynchronous transfer mode terminal;
 a scrambler to scramble a data area of the predetermined data cells to adjust timing information and to convert the user information or idle cells to serial data;
 a first encoder to cyclic redundancy check encode the predetermined data cells; and
 a second encoder to map the data cells from the first encoder that are in units of four bits to data in units of five bits and transfer the mapped serial data from the second encoder to the asynchronous mode terminal through the first interface.

8. A terminal system having both an asynchronous transfer mode terminal function and an asynchronous transfer mode-based asymmetric digital subscriber line terminal function, that enables a user to select connection to an asynchronous transfer mode network or an asymmetric digital subscriber line network, the terminal system comprising:
 a first transmission conversion portion intrinsic to the asynchronous transfer mode network to transfer first serial data;
 a second transmission conversion portion intrinsic to the asymmetric digital subscriber line to transfer second serial data; and
 a common transmission conversion portion to convert the first and the second serial data from the first transmission conversion portion and the second transmission conversion portion into parallel data, wherein the first serial data is transferred through the first transmission conversion portion and the common transmission conversion portion in response to the asynchronous transfer mode network being selected, and the second serial data is transferred through the second transmission conversion portion and the common transmission portion in response to the asymmetric digital subscriber line being selected by the user.

9. The terminal system of claim 8, wherein the first transmission conversion portion comprises:
 a first interface to input the first serial data received from the asynchronous transfer mode network and to output third serial data transferred from the common transmission conversion portion to the asynchronous transfer mode network;
 a decoder to map the first serial data from the first interface that is in units of five bits to data in units of four bits, delineate the mapped first serial data, and provide a periodic timing signal; and
 an encoder to map the third serial data that is in units of four bits to data in units of five bits and transfer the mapped third serial data to the first physical media dependent sublayer through the first interface.

10. The terminal system of claim 9, wherein the second transmission conversion portion comprises:
 a second interface to input the second serial data received from the asymmetric digital subscriber line network and to output third serial data transferred from the common transmission conversion portion to the asymmetric digital subscriber line network; and
 a decoder to cyclic redundancy check decode the second serial data from the second interface and output the decoded second serial data to the common transmission conversion portion.

11. The terminal system of claim 7, wherein the common transmission conversion portion comprises:
 a descrambler to descramble a data area of the converted serial data transferred from the connected transmission conversion portion and convert the descrambled data into a parallel data pattern;
 an interface to store the parallel pattern data and transfer the descrambled data to the cell segmentation and reassembly portion, and to store the predetermined data cells output from the cell segmentation and reassembly portion;
 an idle cell generator to generate idle cells and insert the generated idle cells when there is no converted serial data to be transferred to the connected physical media dependent sublayer;

a scrambler to scramble a data area of the predetermined data cells to adjust timing information and to convert the user information or the idle cells to serial data; and an encoder to cyclic redundancy check encode the serial data from the scrambler and transfer the encoded serial data to the connected physical media dependent sublayer.

12. The terminal system of claim 7, further comprising a selector to select the first transmission conversion portion or the second transmission conversion portion corresponding to the asynchronous transfer mode network or the asymmetric digital subscriber line network selected by the user.

13. The terminal system of claim 12, wherein the first and the second transmission conversion portions, the selector, and the common transmission conversion portion are formed as an application specific integrated circuit.

14. A terminal system having both an asynchronous transfer mode terminal function and an asynchronous transfer mode-based asymmetric digital subscriber line terminal function, that enables a user to selectively connect an asynchronous transfer mode network or an asymmetric digital subscriber line network, the terminal system comprising:

a first physical media dependent sublayer, corresponding to the asynchronous transfer mode network, to output first serial data cells;

a second physical media dependent sublayer, corresponding to the asymmetric digital subscriber line network, to output second serial data cells;

a first transmission conversion portion intrinsic to the asynchronous mode network to delineate the first serial data cells output by the first physical media dependent sublayer;

a second transmission conversion portion intrinsic to the asymmetric digital subscriber line network to delineate the second serial data cells output by the second physical media dependent sublayer;

a selector to select the first transmission conversion portion or the second transmission conversion portion;

a common transmission conversion portion to convert the delineated first or second serial data from the transmission conversion portion selected by the selector into parallel data; and a cell segmentation and reassembly portion to assemble the parallel data from the common transmission conversion portion, change the assembled data to user information that includes user information to be transmitted, divide the user information to be transmitted into predetermined data cells, and output the predetermined data cells to the common transmission conversion portion, wherein the common transmission conversion portion converts the predetermined data cells into serial data and outputs the converted serial data to the selector.

15. The terminal system of claim 14, wherein the common transmission conversion portion comprises:

a descrambler to descramble a data area of the converted serial data transferred from the transmission conversion portion and convert the descrambled data into a parallel data pattern;

an interface to store the parallel pattern data and transfer the descrambled data to the cell segmentation and reassembly portion, and to store the predetermined data cells output from the cell segmentation and reassembly portion;

an idle cell generator to generate idle cells and insert the generated idle cells when there is no converted serial data to be transferred to the connected physical media dependent sublayer;

a scrambler to scramble a data area of the predetermined data cells to adjust timing information and to convert the user information or the idle cells to serial data; and an encoder to cyclic redundancy check encode the serial data from the scrambler and transfer the encoded serial data to the connected physical media dependent sublayer.

16. The terminal system of claim 14, wherein the first and the second transmission conversion portions, the selector, and the common transmission conversion portion are formed as an application specific integrated circuit.

17. The terminal system of claim 14, wherein the cell segmentation and reassembly portion divides the user information to be transmitted into asynchronous transfer mode cells having a header area of 5 bytes and a data area of 48 bytes.

18. The terminal system of claim 14, wherein the first transmission conversion portion comprises:

a first interface to input the first serial data received from the asynchronous transfer mode network and to output third serial data transferred from the common transmission conversion portion to the asynchronous transfer mode network;

a decoder to map the first serial data from the first interface that is in units of five bits to data in units of four bits, delineate the mapped first serial data, and provide a periodic timing signal; and an encoder to map the third serial data from the common transmission portion in units of four bits to data in units of five bits and transfer the mapped third serial data to the first physical media dependent sublayer through the first interface.

19. The terminal system of claim 18, wherein the second transmission conversion portion comprises:

a second interface to input the second serial data received from the asymmetric digital subscriber line network; and a decoder to cyclic redundancy check decode the second serial data from the second interface and transfer the decoded second serial data to the common transmission conversion portion.

20. A method of selectively connecting an asynchronous transfer mode network or an asymmetric digital subscriber line in a terminal system, comprising the steps of:

selecting the asynchronous transfer mode network or the asymmetric digital subscriber line network;

converting serial data, from a transmission conversion portion that corresponds to the selected network, to parallel data;

assembling the parallel data;

changing the assembled data to user information that includes user information to be transmitted;

dividing the user information to be transmitted into predetermined data cells; and converting the predetermined data cells into serial data and outputting the converted serial data to the transmission conversion portion corresponding to the selected network.

* * * * *